(12) United States Patent
Horimizu (10) Patent No.: US 10,173,873 B2
(45) Date of Patent: Jan. 8, 2019

(54) LIFT POINT ALIGNMENT DEVICE FOR VEHICLE MAINTENANCE LIFTS

(71) Applicant: YASUI CORPORATION, Fujinomiya-shi, Shizuoka (JP)

(72) Inventor: Toshihide Horimizu, Fujinomiya (JP)

(73) Assignee: YASUI CORPORATION, Fujinomiya-shi, Shizuoka (JP)

( * ) Notice: Subject to any disclaimer, the term of this patent is extended or adjusted under 35 U.S.C. 154(b) by 71 days.

(21) Appl. No.: 15/320,729

(22) PCT Filed: Jun. 5, 2015

(86) PCT No.: PCT/JP2015/066414
§ 371 (c)(1),
(2) Date: Nov. 17, 2017

(87) PCT Pub. No.: WO2016/009744
PCT Pub. Date: Jan. 21, 2016

(65) Prior Publication Data
US 2018/0072544 A1 Mar. 15, 2018

(30) Foreign Application Priority Data
Jul. 15, 2014 (JP) .................................. 2014-145364

(51) Int. Cl.
*B66F 7/28* (2006.01)
*G01B 11/27* (2006.01)
*B66F 3/46* (2006.01)

(52) U.S. Cl.
CPC .............. *B66F 7/28* (2013.01); *G01B 11/272* (2013.01); *B66F 3/46* (2013.01); *B66F 2700/123* (2013.01)

(58) Field of Classification Search
CPC ........ B66F 7/28; B66F 3/46; B66F 2700/123; G01B 11/27; G01B 11/272
(Continued)

(56) References Cited

U.S. PATENT DOCUMENTS 5,309,289 A * 5/1994 Johnson .................... B60D 1/36
248/467
5,947,447 A * 9/1999 Sorensen .................. B66F 5/04
254/1
(Continued)

FOREIGN PATENT DOCUMENTS

CN 2221027 Y 2/1996
CN 201301196 Y 9/2009
(Continued)

OTHER PUBLICATIONS

The extended European Search Report dated Mar. 15, 2018 for EP Application No. 15821339.7.

*Primary Examiner* — Christopher W Fulton
(74) *Attorney, Agent, or Firm* — TYPHA IP LLC (57) ABSTRACT

Provided is a lift point alignment device (30) including a mirror body (40) detachably attached to a vehicle body holding tool (20), the mirror body (40) including a mirror surface (42) facing upward while the mirror body (40) is attached to the vehicle body holding tool (20), and a light source (50) provided in the mirror body (40) to project light in a vertical direction toward a lower part of a vehicle (1) from the mirror surface (42) of the mirror body (40) attached to the vehicle body holding tool (20), wherein an alignment state of the vehicle body holding tool (20) with respect to lift points (2) of the vehicle (1) is allowed to be recognized based on a match state between an image of the light source (50) and an image of the lift points (2) of the vehicle (1) reflected in the mirror surface (42) of the mirror body (40) observed from a side of the vehicle.

13 Claims, 5 Drawing Sheets (58) Field of Classification Search
USPC .................................. 33/286, 263, 264, 288
See application file for complete search history.

(56) References Cited

U.S. PATENT DOCUMENTS

| | | | | |
|---|---|---|---|---|
| 6,076,847 | A * | 6/2000 | Thornton | B60D 1/36 |
| | | | | 280/477 |
| 9,085,446 | B1 * | 7/2015 | Dahs | B66F 7/00 |
| 9,840,402 | B2 * | 12/2017 | Horimizu | B60S 9/04 |
| 2007/0216136 | A1 * | 9/2007 | Dietz | B60D 1/36 |
| | | | | 280/477 |
| 2011/0216199 | A1 * | 9/2011 | Trevino | B60D 1/36 |
| | | | | 348/148 |
| 2011/0279896 | A1 * | 11/2011 | Uematsu | B60R 1/04 |
| | | | | 359/507 |
| 2012/0060383 | A1 * | 3/2012 | Goddard | B66F 9/0755 |
| | | | | 33/228 |
| 2012/0255151 | A1 * | 10/2012 | Pittman | B60D 1/36 |
| | | | | 29/407.01 |
| 2017/0158241 | A1 * | 6/2017 | Prusinowski | B62D 17/00 |

FOREIGN PATENT DOCUMENTS

| | | |
|---|---|---|
| JP | 2000-238995 A | 9/2000 |
| JP | 2002-128482 A | 5/2002 |
| JP | 2003-81583 A | 3/2003 |

* cited by examiner

LIFT POINT ALIGNMENT DEVICE FOR VEHICLE MAINTENANCE LIFTS

TECHNICAL FIELD

The present invention relates to a lift point alignment device for a vehicle maintenance lift.

BACKGROUND ART

In a vehicle maintenance lifting device, as described in Patent Literature 1, front and rear lifting arms are provided in each of right and left lifting carriages provided to right and left posts, and vehicle body holding tools provided at distal ends of the respective lifting arms are aligned to respective lift points provided at each of two front and rear positions on a left side and two front and rear positions on a right side of a lower part of a vehicle. Thereafter, each of the lifting arms is lifted to horizontally lift up the vehicle.

CITATION LIST

Patent Literature

Patent Literature 1: JP 2002-128482 A

SUMMARY OF THE INVENTION

Technical Problem

Referring to the vehicle maintenance lifting device, an operation of aligning the vehicle body holding tool provided at the distal end of the lifting arm to the lift point provided in the lower part of the vehicle is difficult since the dark lower part of the vehicle needs to be looked into in order to search for the lift point, and entails a difficult work posture in which a head is lowered at the same time.

In addition, in the vehicle maintenance lift, the vehicle body holding tool is provided at each of distal ends of the front and rear lifting arms provided to each of the right and left lifting carriages, and thus all the lifting arms need to be simultaneously lifted and lowered after aligning all the four respective vehicle body holding tools to corresponding places of four lift points in the lower part of the vehicle. A series of operations of aligning the four respective vehicle body holding tools to the corresponding places of the four lift points in the lower part of the vehicle needs to be repeated in order to lift up one vehicle, and a heavy burden is imposed on an operator.

Further, in a recent vehicle including aero parts such as a side skirt in a side portion of the vehicle, the aero parts make it more difficult to find the lift point in the lower part of the vehicle, and make the operation of aligning the vehicle body holding tool to the lift point more difficult.

A subject of the invention is to easily align a vehicle body holding tool provided in a lifting arm of a vehicle maintenance lift to a lift point provided in a lower part of a vehicle.

Solution to Problem

In accordance with an example of the present invention, there is provided a lift point alignment device for a vehicle maintenance lift aligning a vehicle body holding tool provided in a lifting arm of a vehicle maintenance lift to lift points provided in a lower part of a vehicle, the lift point alignment device comprising:

a mirror body detachably attached to the vehicle body holding tool, the mirror body including a mirror surface facing upward while the mirror body is attached to the vehicle body holding tool; and a light source provided in the mirror body to project light in a vertical direction toward the lower part of the vehicle from the mirror surface of the mirror body attached to the vehicle body holding tool, wherein an alignment state of the vehicle body holding tool with respect to the lift points of the vehicle is allowed to be recognized based on a match state between an image of the light source and an image of the lift points of the vehicle reflected in the mirror surface of the mirror body observed from a side of the vehicle.

In accordance with another example of the present invention, in the lift point alignment device for a vehicle maintenance lift, wherein the light source provided in the mirror body is configured to be aligned to a vehicle body support of the vehicle body holding tool while the mirror body is attached to the vehicle body holding tool when the vehicle body support to be aligned to the lift points of the vehicle is provided on an upper surface of the vehicle body holding tool.

In accordance with yet another example of the present invention, in the lift point alignment device for a vehicle maintenance lift, wherein, when the vehicle body support of the vehicle body holding tool forms a linear shape aligned to the lift points having a linear shape of the vehicle, a plurality of light sources is installed on a straight line aligned to the linear vehicle body support of the vehicle body holding tool.

In accordance with another example of the present invention, in the lift point alignment device for a vehicle maintenance lift, wherein the mirror body includes a mounting frame portion installed in a protruding manner on a rear side of the mirror surface, and the mounting frame portion is attached on an outer circumferential portion of the vehicle body holding tool when the mirror body is attached to the vehicle body holding tool.

In accordance with yet another example of the present invention, in the lift point alignment device for a vehicle maintenance lift, wherein the mirror body includes a mounting protrusion installed in a protruding manner on the rear side of the mirror surface, and the mounting protrusion is fit to a groove-shaped vehicle body support provided within the upper surface of the vehicle body holding tool when the mirror body is attached to the vehicle body holding tool.

In accordance with another example of the present invention, in the lift point alignment device for a vehicle maintenance lift, wherein the light source includes a light emitting diode (LED), and the mirror body includes a battery and a lighting switch for the LED.

Effects (a) When the mirror body of the lift point alignment device in which the light sources are switched ON is attached to the vehicle body holding tool provided at the distal end of the lifting arm, and the vehicle body holding tool of the lifting arm is inserted into the lower part of the vehicle, items i and ii below result.

i. Light of the light sources is vertically projected toward the lower part of the vehicle from the mirror surface of the mirror body attached to the upper portion of the vehicle body holding tool. In this instance, the image of the lower part of the vehicle and the image of the light sources projected onto the lower part of the vehicle are reflected in the mirror surface of the mirror body.

ii. The operator positioned on a side of the vehicle may observe the image of the lower part of the vehicle and the image of the light sources projected onto the lower part of the vehicle, which are reflected in the mirror surface of the mirror body, by reflection in the mirror surface. In this way, the operator may adjust a distal end position of the lifting arm such that the image of the light sources reflected in the mirror surface of the mirror body matches the image of the lift points of the lower part of the vehicle, thereby aligning the vehicle body holding tool to the lift points of the lower part of the vehicle.

Positions at which the image of the lower part of the vehicle and the image of the light sources projected onto the lower part of the vehicle are reflected in the mirror surface change depending on an angle and the position at which the operator views the mirror surface of the mirror body. However, light of the light sources is projected in the vertical direction toward the lower part of the vehicle, and a mutual positional relation between the image of the lower part of the vehicle and the image of the light sources projected onto the lower part of the vehicle does not change. Therefore, irrespective of a position from which the operator views the mirror surface of the mirror body, the mutual positional relation between the image of the lower part of the vehicle and the image of the light sources projected onto the lower part of the vehicle may be viewed, and the vehicle body holding tool may be aligned to the lift points in the lower part of the vehicle as described above.

At the time of lifting up the vehicle, the vehicle body holding tool may be put to the lift points of the vehicle by removing the mirror body of the lift point alignment device from the vehicle body holding tool, and lifting the vehicle body holding tool of the lifting arm in the vertical direction.

The operator may neither look into the dark lower part of the vehicle nor take a difficult work posture in which a head is lowered in order to search for the lift points in the lower part of the vehicle, and may easily align the vehicle body holding tool to the lift points in the lower part of the vehicle.

(b) While the mirror body is attached to the vehicle body holding tool, the light sources provided in the mirror body are configured to be aligned to the vehicle body support of the vehicle body holding tool. Therefore, when the distal end position of the lifting arm is adjusted such that the image of the light sources reflected in the mirror surface of the mirror body matches the image of the lift points in the lower part of the vehicle, the vehicle body support of the vehicle body holding tool configured to be aligned to the light sources is naturally aligned to the lift points in the lower part of the vehicle.

(c) It is presumed that, when the vehicle body support of the vehicle body holding tool of the above-described item (b) forms a linear shape aligned to the linear lift points of the vehicle, the plurality of light sources is installed on a straight line aligned to the linear vehicle body support of the vehicle body holding tool. Therefore, when the distal end position of the lifting arm is adjusted through parallel movement and rotational movement such that the image of the plurality of light sources installed on a straight line reflected in the mirror surface of the mirror body matches the image of the linear lift points (side seal, etc.) in the lower part of the vehicle, the linear vehicle body support of the vehicle body holding tool, to which the plurality of light sources is configured to be aligned, is aligned to the linear lift points in the lower part of the vehicle.

(d) The mirror body of the above-described items (b) and (c) includes the mounting frame portion installed in the protruding manner on a rear side of the mirror surface, and the mounting frame portion is attached on the outer circumferential portion of the vehicle body holding tool at the time of attaching the mirror body to the vehicle body holding tool. In this way, a state in which the mirror body is attached to the vehicle body holding tool may be fixed, and the light sources provided in the mirror body may be reliably aligned to the vehicle body support of the vehicle body holding tool.

(e) The mirror body of the above-described items (b) to (d) includes the mounting protrusion installed in the protruding manner on a rear side of the mirror surface, and the mounting protrusion is fit to the groove-shaped vehicle body support provided within an upper surface of the vehicle body holding tool at the time of attaching the mirror body to the vehicle body holding tool. In this way, a state in which the mirror body is attached to the vehicle body holding tool may be fixed, and the light sources provided in the mirror body may be reliably aligned to the groove-shaped vehicle body support of the vehicle body holding tool. When the distal end position of the lifting arm is adjusted such that the image of the light sources reflected in the mirror surface of the mirror body matches the image of the lift points in the lower part of the vehicle, the groove-shaped vehicle body support of the vehicle body holding tool configured to be aligned to the light sources is naturally stably aligned to the lift points in the lower part of the vehicle.

(f) The light sources of the lift point alignment device include LEDs, and the mirror body includes the battery and the lighting switch for the LEDs. A carrying and handling property of the lift point alignment device may be improved.

BRIEF DESCRIPTION OF THE DRAWINGS

FIGS. 5(A), 5(B), and 5(C) illustrate the lift point alignment device.

FIGS. 6(A) and 6(B) illustrate an image of a lift point and an image of the light source reflected in a mirror surface of the mirror body.

FIGS. 7(A) and 7(B) illustrate a modified example of the lift point alignment device.

Figure 1:
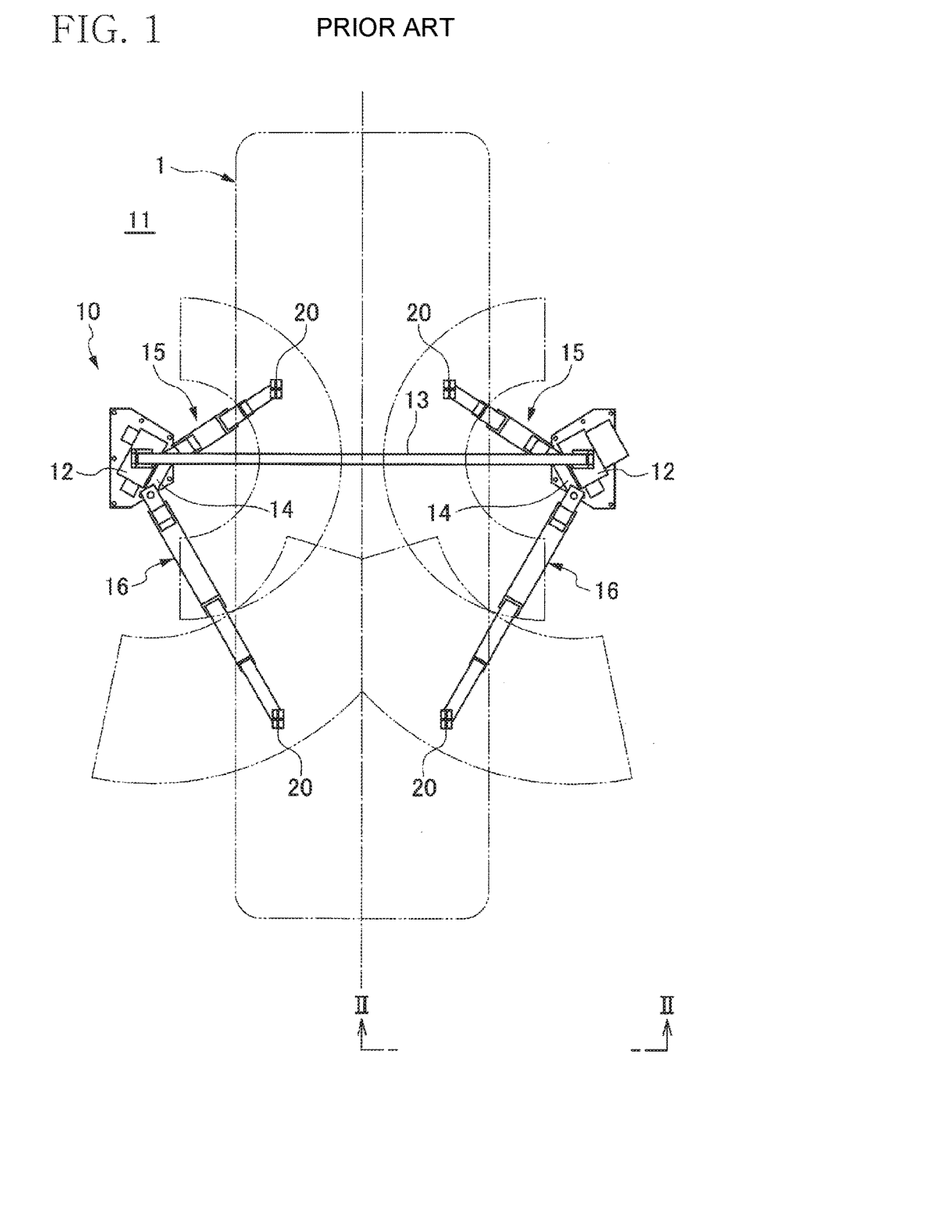
FIG. 1 is a plan view illustrating a vehicle maintenance lift.
Figure 2:
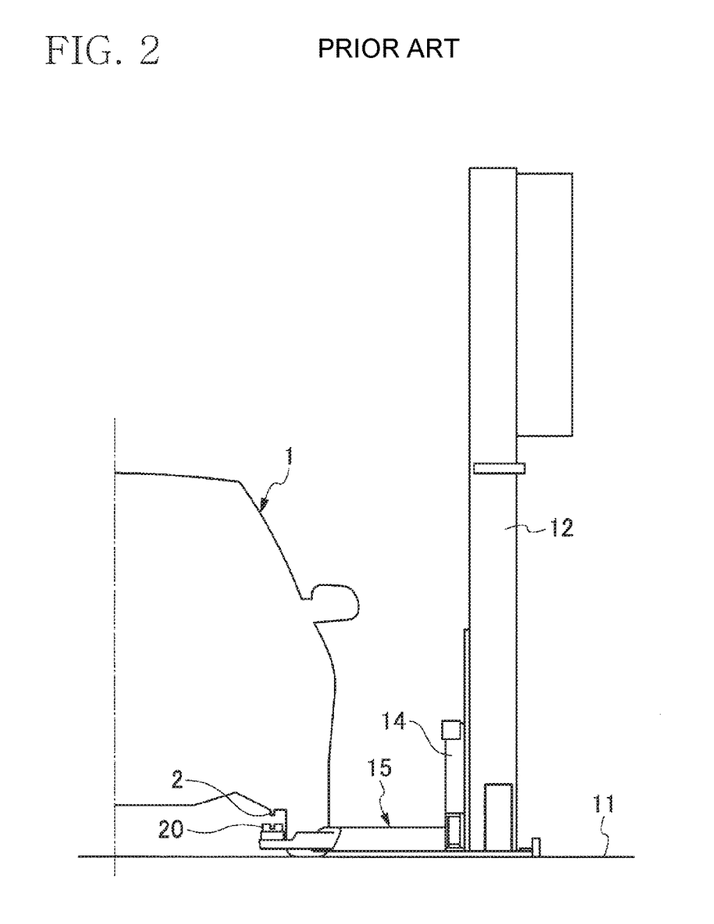
FIG. 2 is an arrow view taken along II-II line of FIG. 1.

DESCRIPTION OF EMBODIMENTS in a vehicle maintenance lift 10, as illustrated in FIG. 1 and FIG. 2, two posts 12, 12 are vertically arranged on both right and left sides of a lift operation region on a floor 11 of a maintenance area. The posts 12, 12 form a portal by being connected by a connection beam 13.

In the vehicle maintenance lift 10, respective right and left lifting carriages 14 lifted and lowered in synchronization with each other are provided in the respective right and left posts 12. In addition, each of the lifting carriages 14 includes a front short lifting arm 15 and a rear long lifting arm 16 rotatably supported within a horizontal plane.

The front short lifting arm 15 has a proximal arm, an intermediate arm, and a distal arm so as to be extendable and retractable in two short stages, and has a vehicle body holding tool 20 at a distal end of the distal arm. The rear long lifting arm 16 has a proximal arm, an intermediate arm, and a distal arm so as to be extendable and retractable in two long stages, and has a vehicle body holding tool 20 at a distal end of the distal arm. A range in which each of the lifting arms 15 and 16 rotates, extends, and retracts within the horizontal plane is indicated by an arc-shaped range of FIG. 1.

The vehicle maintenance lift 10 rotates, extends, and retracts the front short lifting arm 15 and the rear long lifting arm 16 provided in the respective right and left lifting carriages 14 within the horizontal plane to align the respective vehicle body holding tools 20 provided at distal ends thereof to lift points 2 provided at each of two front and rear positions on a left side and two front and rear positions on a right side in a lower part of a vehicle 1. Thereafter, both the lifting arms 15 and 16 are synchronized and lifted by operating a lifting switch to allow the vehicle 1 to be horizontally lifted up or lifted down.

Figure 3:
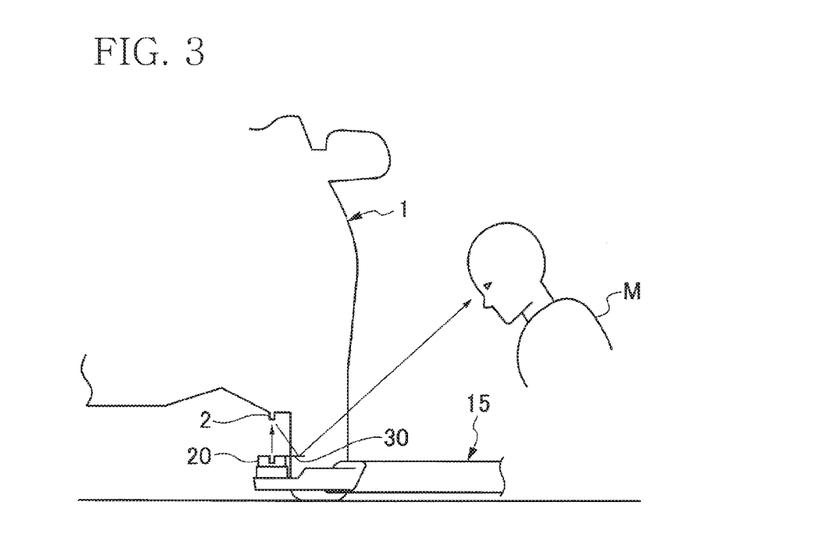
FIG. 3 is a schematic diagram illustrating a usage state of a lift point alignment device.
Figure 4:
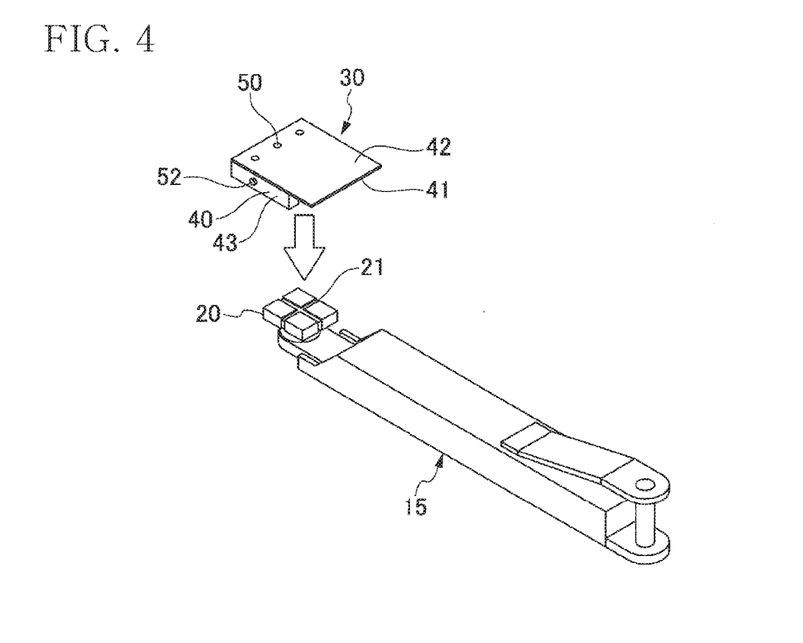
FIG. 4 is a schematic perspective view illustrating a lifting arm and the lift point alignment device.

As illustrated in FIG. 3, for example, the lift points 2 provided in the lower part of the vehicle 1 consist of a linear side seal. In addition, as illustrated in FIG. 3 and FIG. 4, for example, each of the vehicle body holding tools 20 provided at the distal ends of the respective lifting arms 15 and 16 has a shape of a rectangular block made of hard rubber, etc., and groove-shaped vehicle body supports 21 and 21 forming a linear shape (a cross shape) are provided on an upper surface thereof. The vehicle body support 21 of the vehicle body holding tool 20 is fit to the side seal corresponding to the lift points 2 in the lower part of the vehicle 1.

Hereinafter, a detailed description will be given of a lift point alignment device 30 that aligns the respective vehicle body holding tool 20 provided at the distal ends of the respective lifting arms 15 and 16 to the lift points 2 in the lower part of the vehicle 1.

Figure 5A:
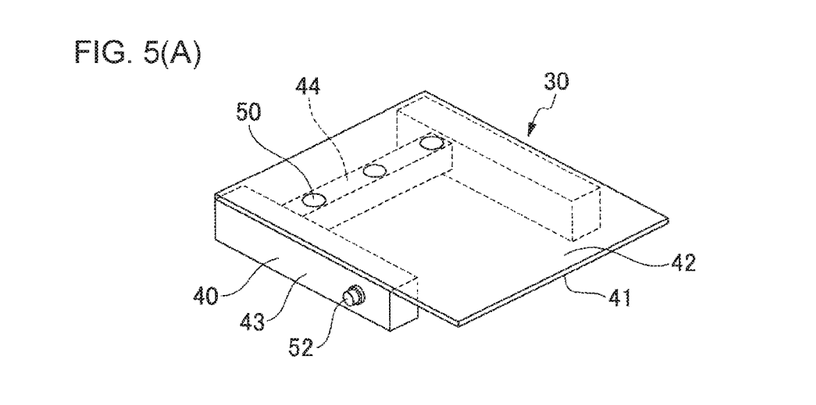
FIG. 5(A) is a general perspective view.

As illustrated in FIG. 5(A), the lift point alignment device 30 includes a mirror body 40 and light sources 50.

The mirror body 40 is detachably attached to the vehicle body holding tool 20. The mirror body 40 has a mirror plate 41, and a surface of the mirror plate 41 is used as a mirror surface 42. In the mirror body 40, the mirror surface 42 of the mirror plate 41 is arranged upward while the mirror body 40 is attached to the vehicle body holding tool 20. For example, the surface of the mirror plate 41 consisting of a stainless steel plate may be subjected to mirror surface finishing and used as the mirror surface 42.

The light sources 50 are provided in the mirror body 40 to project spot-shaped light in a vertical direction toward the lower part of the vehicle 1 from the mirror surface 42 of the mirror body 40 provided in the vehicle body holding tool 20.

In this way, as illustrated in FIG. 3, the lift point alignment device 30 observes an image A of the lift points 2 of the vehicle 1 and an image B of the light sources 50 reflected in the mirror surface 42 of the mirror body 40 by an operator M positioned at a side of the vehicle 1. An alignment state of the vehicle body holding tool 20 with respect to the lift points 2 of the vehicle 1 is allowed to be recognized based on a match state between the image A of the lift points 2 and the image B of the light sources 50 reflected in the mirror surface 42 of the mirror body 40 observed from the side of the vehicle 1 as described above.

In the present embodiment, as described in the foregoing, the vehicle body support 21 to be aligned to the lift points 2 of the vehicle 1 is provided on the upper surface of the vehicle body holding tool 20. In this instance, in the lift point alignment device 30, while the mirror body 40 is attached to the vehicle body holding tool 20, the light sources 50 provided in the mirror body 40 are installed at a position aligned to a vertically upper portion of the vehicle body support 21 of the vehicle body holding tool 20.

Further, in the present embodiment, as described in the foregoing, it is presumed that the vehicle body support 21 of the vehicle body holding tool 20 forms a linear shape (a cross shape) aligned to the linear lift points 2 (side seal) provided in the lower part of the vehicle 1. The linear lift points 2 (side seal) provided in the lower part of the vehicle 1 are specified by cutting off a lift central portion 2L of the side seal in a concave shape (FIGS. 6(A) and 6(B)). In this instance, in the lift point alignment device 30, a plurality of light sources (three light sources in the present embodiment) 50 are installed on a straight line aligned to the linear vehicle body support 21 of the vehicle body holding tool 20. One central light source among the three light sources 50 is aligned to a central position of the linear vehicle body support 21 of the vehicle body holding tool 20.

Further, in the present embodiment, as illustrated in FIG. 5(A), the mirror body 40 of the lift point alignment device 30 includes mounting frame portions 43 installed in a protruding manner at two sides (two right and left sides) facing each other on a rear side of the mirror surface 41. In addition, when the mirror body 40 is attached to the vehicle body holding tool 20, each of the mounting frame portions 43 is attached on an outer circumferential portion of the rectangular block-shaped vehicle body holding tool 20 to interpose two side surfaces facing each other of the rectangular block-shaped vehicle body holding tool 20 between the mounting frame portions 43.

Further, in the present embodiment, as illustrated in FIG. 5(A), the mirror body 40 of the lift point alignment device 30 includes a mounting protrusion 44 installed in a protruding manner by being arranged to be perpendicular to the mounting frame portion 43 between the above-described two mounting frame portions 43, 43 on the rear side of the mirror surface 41. In addition, when the mirror body 40 is attached to the vehicle body holding tool 20, as illustrated in FIG. 5(C), the mounting protrusion 44 is fit to the groove-shaped vehicle body support 21 provided within an upper surface of the vehicle body holding tool 20. The mirror body 40 is fixedly configured such that the plurality of light sources 50 installed on the straight line is aligned to the vertically upper portion of the linear vehicle body support 21 of the vehicle body holding tool 20 by the presence of the two mounting frame portions 43, 44 and the above-described mounting protrusion 44 while the mirror body 40 is attached to the vehicle body holding tool 20.

Figure 5B:
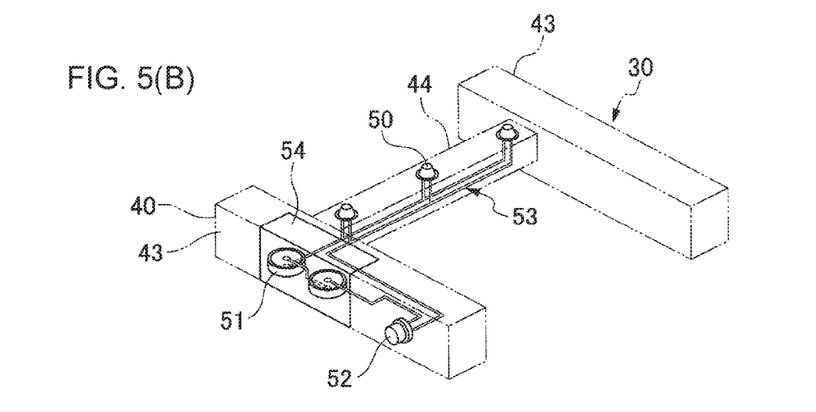
FIG. 5(B) is a schematic view illustrating an electric circuit of a light source incorporated in a mirror body.
Figure 5C:
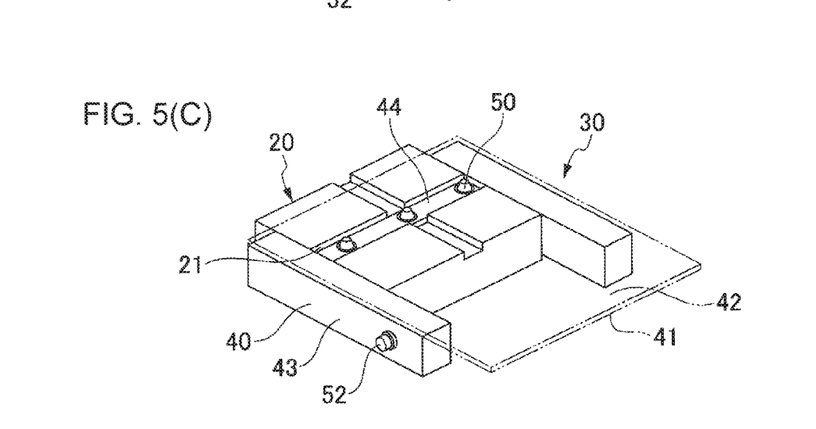
FIG. 5(c) is a schematic view illustrating a structure for attaching the mirror body to a vehicle body holding tool.

In this instance, in the lift point alignment device 30, as illustrated in FIG. 5(B), the light sources 50 consist of LEDs, and three LEDs are incorporated in the mounting protrusion 44. In addition, the lift point alignment device 30 incorporates a battery 51 such as a button-type battery and a lighting switch 52 having a push button type, etc. for the LEDs in the mounting frame portion 43. Further, an electric circuit 53 that connects the light sources 50, the battery 51, and the lighting switch 52 to each other is incorporated in the mirror body 40 (the mounting frame portion 43 and the mounting protrusion 44). The battery 51 is hidden by a battery replacement cover 54 provided in the mounting frame portion 43, and a battery may be replaced by removing the cover 54. The battery 51 is fixed by a battery holder, and a battery may be replaced even when an electric wiring process (disconnection, connection) is not performed. The lighting switch 52 performs an alternate operation. An LED is switched ON when the lighting switch 52 is pressed once, and the LED is switched OFF when the lighting switch 52 is pressed once again.

The present embodiment has the following effects.

(a) When the mirror body 40 of the lift point alignment device 30 in which the light sources 50 are switched ON is attached to the vehicle body holding tool 20 provided at the distal end of the lifting arm 15, 16, and the vehicle body holding tool 20 of the lifting arm 15, 16 is inserted into the lower part of the vehicle 1, items i and ii below result.

i. Light of the light sources 50 is vertically projected toward the lower part of the vehicle 1 from the mirror surface 42 of the mirror body 40 attached to the upper portion of the vehicle body holding tool 20. In this instance, the image A of the lower part of the vehicle 1 and the image B of the light sources 50 projected onto the lower part of the vehicle 1 are reflected in the mirror surface 42 of the mirror body 40.

ii. The operator M positioned on a side of the vehicle 1 may observe the image A of the lower part of the vehicle 1 and the image B of the light sources 50 projected onto the lower part of the vehicle 1, which are reflected in the mirror surface 42 of the mirror body 40, by reflection in the mirror surface 42. In this way, the operator M may adjust a distal end position of the lifting arm 15, 16 such that the image B of the light sources 50 reflected in the mirror surface 42 of the mirror body 40 matches the image A of the lift points 2 of the lower part of the vehicle 1 as illustrated in FIG. 6(A), thereby aligning the vehicle body holding tool 20 to the lift points 2 of the lower part of the vehicle 1.

Figure 6A:
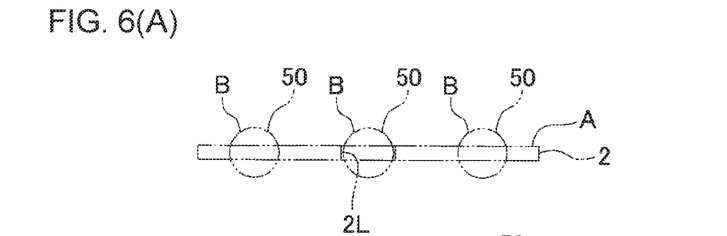
FIG. 6(A) is a schematic view illustrating a match state.

FIG. 6(A) illustrates a match state between the image A of the lift points 2 and the image B of the light sources 50. The image B of the three light sources 50 overlaps the image A of the lift points 2 having a linear shape. A position and a direction of the vehicle body holding tool 20 are aligned to the lift points 2 of the vehicle 1.

Figure 6B:
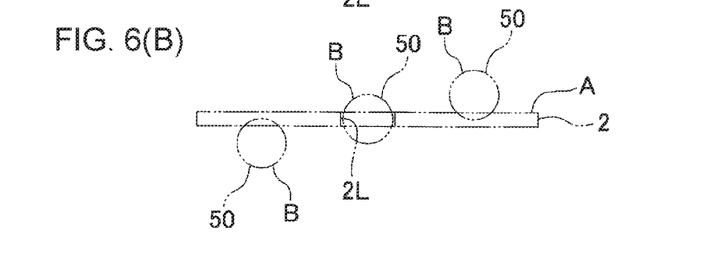
FIG. 6(B) is a schematic view illustrating a mismatch state.

FIG. 6(B) illustrates a mismatch state between the image A of the lift points 2 and the image B of the light sources 50. Only the image B of one light source 50 among the three light sources 50 overlaps only a portion corresponding to the lift central portion 2L in the image A of the lift points 2 having the linear shape. While a central position of the vehicle body holding tool 20 matches the lift central portion 2L of the lift points 2, a direction of the vehicle body holding tool 20 is not aligned to the lift points 2.

Positions at which the image A of the lower part of the vehicle 1 and the image B of the light sources 50 projected onto the lower part of the vehicle 1 are reflected in the mirror surface 42 change depending on an angle and the position at which the operator M views the mirror surface 42 of the mirror body 40. However, light of the light sources 50 is projected in the vertical direction toward the lower part of the vehicle 1, and a mutual positional relation between the image A of the lower part of the vehicle 1 and the image B of the light sources 50 projected onto the lower part of the vehicle 1 does not change. Therefore, irrespective of a position from which the operator M views the mirror surface 42 of the mirror body 40, the mutual positional relation between the image A of the lower part of the vehicle 1 and the image B of the light sources 50 projected onto the lower part of the vehicle 1 may be viewed, and the vehicle body holding tool 20 may be aligned to the lift points 2 in the lower part of the vehicle 1 as described above.

At the time of lifting up the vehicle 1, the vehicle body holding tool 20 may be put to the lift points 2 of the vehicle 1 by removing the mirror body 40 of the lift point alignment device 30 from the vehicle body holding tool 20, and lifting the vehicle body holding tool 20 of the lifting arm 15, 16 in the vertical direction.

The operator M may neither look into the dark lower part of the vehicle 1 nor take a difficult work posture in which a head is lowered in order to search for the lift points 2 in the lower part of the vehicle 1, and may easily align the vehicle body holding tool 20 to the lift points 2 in the lower part of the vehicle 1.

(b) While the mirror body 40 is attached to the vehicle body holding tool 20, the light sources 50 provided in the mirror body 40 are configured to be aligned to the vehicle body support 21 of the vehicle body holding tool 20. Therefore, when the distal end position of the lifting arm 15, 16 is adjusted such that the image B of the light sources 50 reflected in the mirror surface 42 of the mirror body 40 matches the image A of the lift points 2 in the lower part of the vehicle 1, the vehicle body support 21 of the vehicle body holding tool 20 configured to be aligned to the light sources 50 is naturally aligned to the lift points 2 in the lower part of the vehicle 1.

(c) It is presumed that, when the vehicle body support 21 of the vehicle body holding tool 20 of the above-described item (b) forms a linear shape aligned to the linear lift points 2 of the vehicle 1, the plurality of light sources 50 is installed on a straight line aligned to the linear vehicle body support 21 of the vehicle body holding tool 20. Therefore, when the distal end position of the lifting arm 15, 16 is adjusted through parallel movement and rotational movement such that the image B of the plurality of light sources 50 installed on a straight line reflected in the mirror surface 42 of the mirror body 40 matches the image A of the linear lift points 2 (side seal, etc.) in the lower part of the vehicle 1, the linear vehicle body support 21 of the vehicle body holding tool 20, to which the plurality of light sources 50 is configured to be aligned, is aligned to the linear lift points 2 in the lower part of the vehicle 1.

(d) The mirror body 40 of the above-described items (b) and (c) includes the mounting frame portion 43 installed in the protruding manner on a rear side of the mirror surface 42, and the mounting frame portion 43 is attached on the outer circumferential portion of the vehicle body holding tool 20 at the time of attaching the mirror body 40 to the vehicle body holding tool 20. In this way, a state in which the mirror body 40 is attached to the vehicle body holding tool 20 may be fixed, and the light sources 50 provided in the mirror body 40 may be reliably aligned to the vehicle body support 21 of the vehicle body holding tool 20.

(e) The mirror body 40 of the above-described items (b) to (d) includes the mounting protrusion 44 installed in the protruding manner on a rear side of the mirror surface 42, and the mounting protrusion 44 is fit to the groove-shaped vehicle body support 21 provided within an upper surface of the vehicle body holding tool 20 at the time of attaching the mirror body 40 to the vehicle body holding tool 20. In this way, a state in which the mirror body 40 is attached to the vehicle body holding tool 20 may be fixed, and the light sources 50 provided in the mirror body 40 may be reliably aligned to the groove-shaped vehicle body support 21 of the vehicle body holding tool 20. When the distal end position of the lifting arm 15, 16 is adjusted such that the image B of the light sources 50 reflected in the mirror surface 42 of the mirror body 40 matches the image A of the lift points 2 in the lower part of the vehicle 1, the groove-shaped vehicle body support 21 of the vehicle body holding tool 20 configured to be aligned to the light sources 50 is naturally stably aligned to the lift points 2 in the lower part of the vehicle 1.

(f) The light sources 50 of the lift point alignment device 30 include LEDs, and the mirror body 40 includes the battery 51 and the lighting switch 52 for the LEDs. A carrying and handling property of the lift point alignment device 30 may be improved.

Figure 7A:
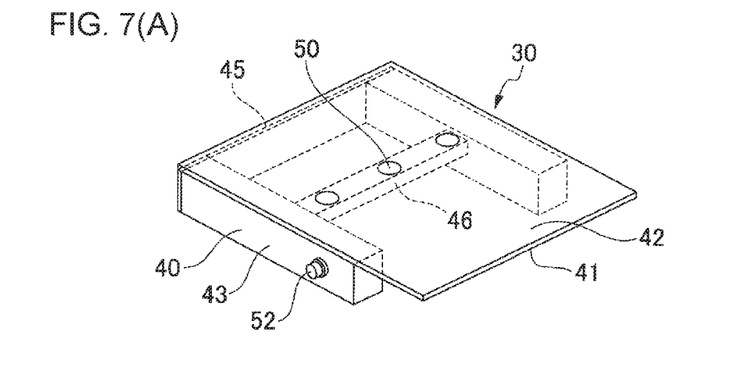
FIG. 7(A) is a general perspective view.
Figure 7B:
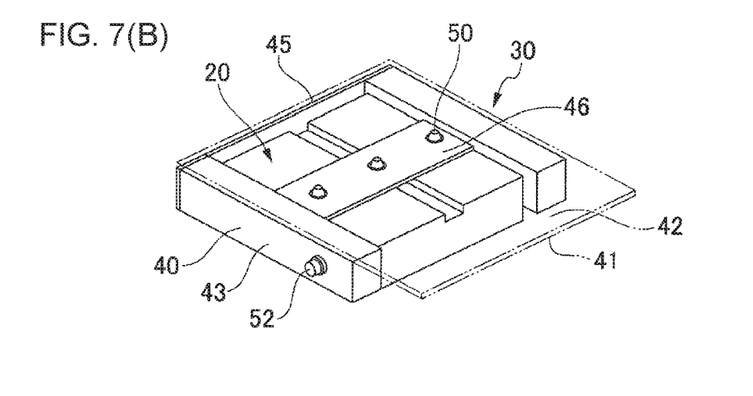
FIG. 7(B) is a schematic view illustrating a structure for attaching a mirror body to a vehicle body holding tool.

FIGS. 7(A) and 7(B) is a modified example of the lift point alignment device 30, and this modified example is different from the above embodiment in that a mirror body 40 includes mounting frame portions 43, 43 installed in a protruding manner at two right and left sides facing each other on a rear side of a mirror plate 41, and includes a mounting frame portion 45 installed in a protruding manner at one front side on the rear side of the mirror plate 41 as illustrated in FIGS. 7(A) and 7(B). In addition, at the time of attaching the mirror body 40 to the vehicle body holding tool 20, the mounting frame portions 43, 45 are attached on three sides intersecting one another in an outer circumferential portion of a rectangular block-shaped vehicle body holding tool 20. In this way, the mirror body 40 is fixedly configured such that a plurality of light sources 50 installed on a straight line is aligned to a vertically upper portion of a linear vehicle body support 21 of the vehicle body holding tool 20 while the mirror body 40 is attached to the vehicle body holding tool 20.

In FIGS. 7(A) and 7(B), the mirror body 40 of the lift point alignment device 30 includes a connection frame 46 perpendicular to the above-described two mounting frame portions 43, 43 on the rear side of the mirror plate 41. The connection frame 46 of the mirror body 40 is configured to be aligned to the vertically upper portion of the vehicle body support 21 of the vehicle body holding tool 20 while the mirror body 40 is attached to the vehicle body holding tool 20, and three light sources 50 forming a straight line are arranged on a center line of the connection frame 46.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the vehicle body holding tool provided in the lifting arm may not have a rectangular block shape, and may have a round disc shape.

The vehicle body holding tool may not include the groove-shaped vehicle body support having the linear shape on the upper surface thereof. The vehicle body holding tool may include a hole-shaped vehicle body support in a central portion on the upper surface.

The lift points of the vehicle may not have a linear shape such as a side seal, and may have a surface shape.

The mirror body of the lift point alignment device may include a mounting portion, which is detachably engaged with an outer circumference of the vehicle body holding tool to regulate free movement in a horizontal direction, on a rear side of the mirror plate.

The mirror surface of the mirror body may not be formed by performing mirror surface finishing on the stainless steel plate.

The light source may not have a spot shape, and may have a line shape. The light source is not restricted to an LED, and may correspond to laser beam.

INDUSTRIAL APPLICABILITY

According to the invention, a vehicle body holding tool provided in a lifting arm of a vehicle maintenance lift may be easily aligned to lift points provide in a lower part of a vehicle.

REFERENCE SIGNS LIST 1 vehicle
2 lift point
10 vehicle maintenance lift
15, 16 lifting arm
20 vehicle body holding tool
21 groove-shaped vehicle body support
30 lift point alignment device
40 mirror body
42 mirror surface
43 mounting frame portion
44 mounting protrusion
45 mounting frame portion
50 light source
51 battery
52 lighting switch

What is claimed is:

1. A lift point alignment device for a vehicle maintenance lift aligning a vehicle body holding tool provided in a lifting arm of a vehicle maintenance lift to lift points provided in a lower part of a vehicle, the lift point alignment device comprising:
   a mirror body detachably attached to the vehicle body holding tool, the mirror body including a mirror surface facing upward while the mirror body is attached to the vehicle body holding tool; and
   a light source provided in the mirror body to project light in a vertical direction towards the lower part of the vehicle from the mirror surface of the mirror body attached to the vehicle body holding tool;
   wherein an alignment state of the vehicle body holding tool with respect to the lift points of the vehicle is allowed to be recognized based on a match state between an image of the light source and an image of the lift points of the vehicle reflected in the mirror surface of the mirror body observed from a side of the vehicle.

2. The lift point alignment device for the vehicle maintenance lift according to claim 1, wherein the light source provided in the mirror body is configured to be aligned to a vehicle body support of the vehicle body holding tool while the mirror body is attached to the vehicle body holding tool when the vehicle body support to be aligned to the lift points of the vehicle is provided on an upper surface of the vehicle body holding tool.

3. The lift point alignment device for the vehicle maintenance lift according to claim 2, wherein, when the vehicle body support of the vehicle body holding tool forms a linear shape aligned to the lift points having the linear shape of the vehicle, a plurality of light sources is installed on a straight line aligned to the linear vehicle body support of the vehicle body holding tool.

4. The lift point alignment device for the vehicle maintenance lift according to claim 3, wherein the mirror body includes a mounting frame portion installed in a protruding manner on a rear side of the mirror surface, and the mounting frame portion is attached on an outer circumferential portion of the vehicle body holding tool when the mirror body is attached to the vehicle body holding tool.

5. The lift point alignment device for the vehicle maintenance lift according to claim 3, wherein the mirror body includes a mounting protrusion installed in a protruding manner on a rear side of the mirror surface, and the mounting protrusion is fit to a groove-shaped vehicle body support provided within the upper surface of the vehicle body holding tool when the mirror body is attached to the vehicle body holding tool.

6. The lift point alignment device for the vehicle maintenance lift according to claim 3, wherein the light source includes a light emitting diode (LED), and the mirror body includes a battery and a lighting switch for the LED.

7. The lift point alignment device for the vehicle maintenance lift according to claim 2, wherein the mirror body includes a mounting frame portion installed in a protruding manner on a rear side of the mirror surface, and the mounting frame portion is attached on an outer circumferential portion of the vehicle body holding tool when the mirror body is attached to the vehicle body holding tool.

8. The lift point alignment device for the vehicle maintenance lift according to claim 7, wherein the mirror body includes a mounting protrusion installed in a protruding manner on the rear side of the mirror surface, and the mounting protrusion is fit to a groove-shaped vehicle body support provided within the upper surface of the vehicle body holding tool when the mirror body is attached to the vehicle body holding tool.

9. The lift point alignment device for the vehicle maintenance lift according to claim 7, wherein the light source includes a light emitting diode (LED), and the mirror body includes a battery and a lighting switch for the LED.

10. The lift point alignment device for the vehicle maintenance lift according to claim 2, wherein the mirror body includes a mounting protrusion installed in a protruding manner on a rear side of the mirror surface, and the mounting protrusion is fit to a groove-shaped vehicle body support provided within the upper surface of the vehicle body holding tool when the mirror body is attached to the vehicle body holding tool.

11. The lift point alignment device for the vehicle maintenance lift according to claim 10, wherein the light source includes a light emitting diode (LED), and the mirror body includes a battery and a lighting switch for the LED.

12. The lift point alignment device for the vehicle maintenance lift according to claim 2, wherein the light source includes a light emitting diode (LED), and the mirror body includes a battery and a lighting switch for the LED.

13. The lift point alignment device for the vehicle maintenance lift according to claim 1, wherein the light source includes a light emitting diode (LED), and the mirror body includes a battery and a lighting switch for the LED.

* * * * *